May 13, 1947. W. C. HASSELHORN ET AL 2,420,478
UNDERGROUND CABLE DISTRIBUTING UNIT
Filed July 20, 1942 3 Sheets-Sheet 2
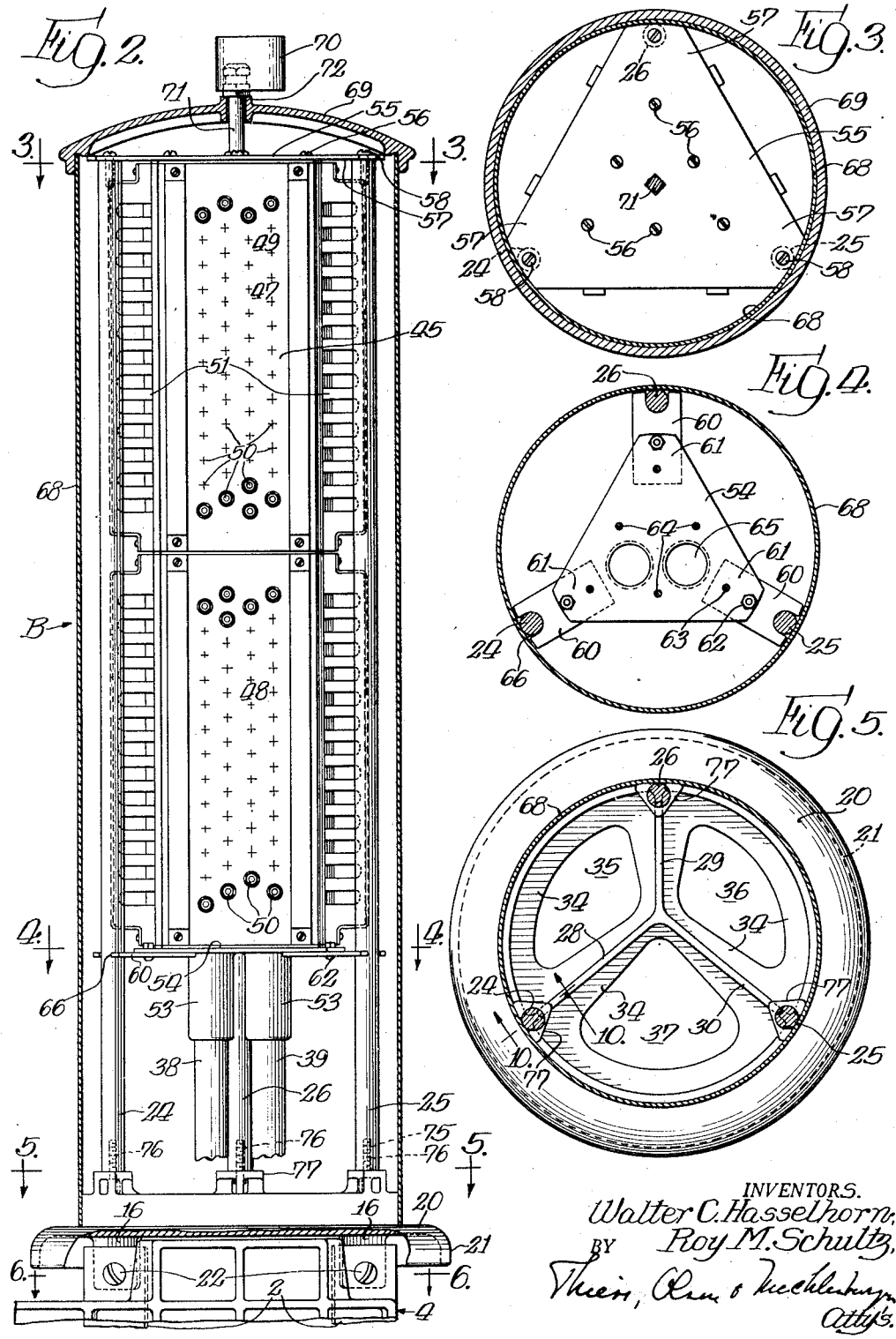
INVENTORS.
Walter C. Hasselhorn,
Roy M. Schultz,
BY
Thiess, Olem & Mechlenburg
Attys.

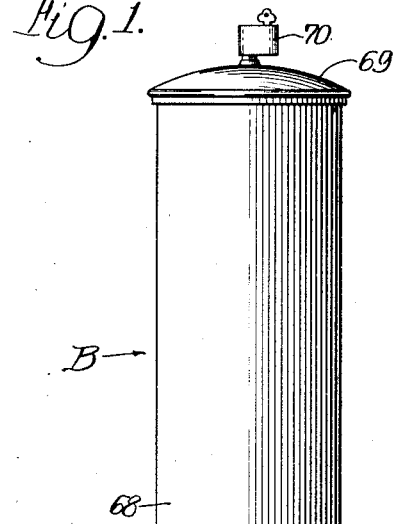
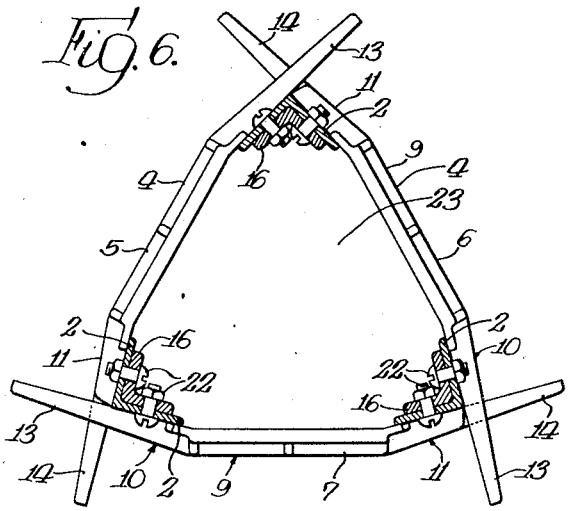

May 13, 1947.   W. C. HASSELHORN ET AL   2,420,478
UNDERGROUND CABLE DISTRIBUTING UNIT
Filed July 20, 1942    3 Sheets-Sheet 3
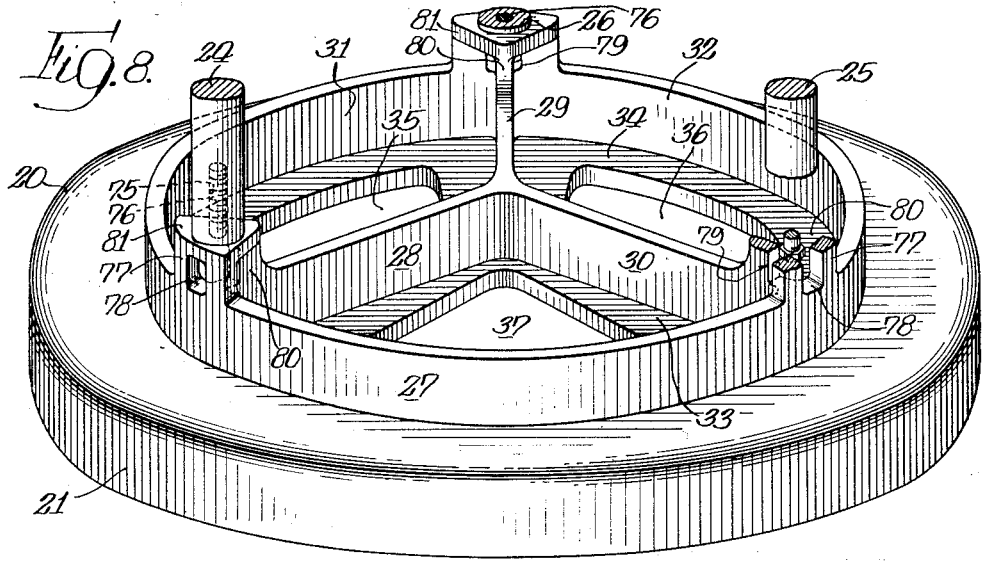
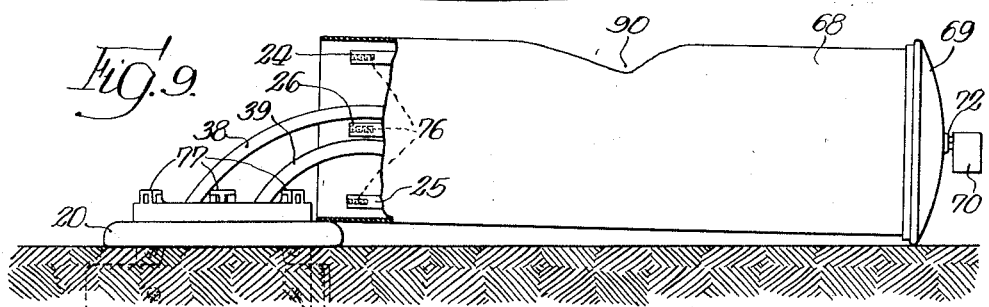
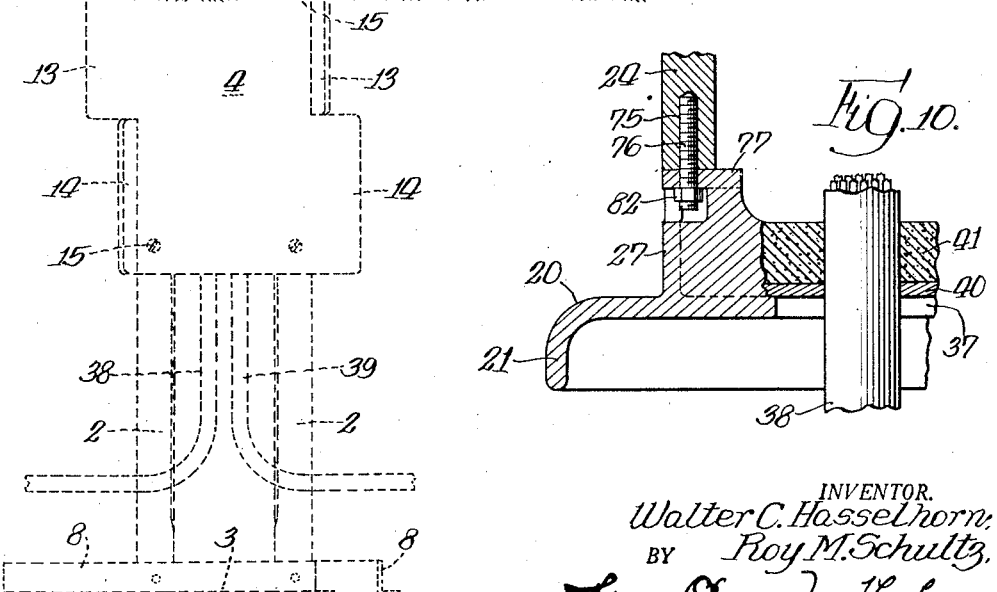
INVENTOR.
Walter C. Hasselhorn,
BY Roy M. Schultz,
Thiess, Olsen & Mecklenburger
Attys.

Patented May 13, 1947

2,420,478

UNITED STATES PATENT OFFICE 2,420,478

UNDERGROUND CABLE DISTRIBUTING UNIT

Walter C. Hasselhorn and Roy M. Schultz, Chicago, Ill., assignors to Cook Electric Company, Chicago, Ill., a corporation of Illinois Application July 20, 1942, Serial No. 451,590

34 Claims. (Cl. 174—60)

This invention relates to underground cable distributing units and provides for terminal and distribution facilities for underground cables either buried directly in the ground or carried in underground conduits.

The principal objects of the invention are to provide a distributing unit for underground cables that embodies certain novel features increasing the efficiency of use and the adaptability of the structure to meet the requirements for this type of distribution, and further, to provide a unit that is compact and sturdy and may be subjected to rough usage with minimum damage or loss of structure in case of surface collisions therewith and without necessarily disturbing the service provided thereby or damaging the terminal connections within.

The invention is directed to a novel form of unit built in two sections designed to be shipped in knockdown condition and to be quickly assembled at the location of use. The unit eliminates expensive manhole construction of concrete and brick and may be installed in an enlargement of the cable-laying trench without delay or waste of time, or without requiring special labor or materials. The unit is further arranged to provide permanency of installation and permit enlargement of or change in terminal capacity without replacement of the structure or without disturbance of the wiring connections already made so as not to cause interference with the service then in force.

The distributing unit herein disclosed is also arranged to provide maximum protection against external impacts by providing in effect a mounting for the portion above the ground that may be, for example, of the floating type so as to cause this upper portion to be sheared from the base and toppled over without injury to the terminal or distributing panel and to the cables extending upwardly thereto from the underground portion. The invention is directed to providing structure which allows the portion above the ground to yield to such external impacts, and, although a part of the structure may be damaged and require replacement, the terminal or wiring connections will remain intact so as not to cause a disturbance in the service and only minimum replacement will be necessary.

The invention is also directed to providing structure which permits the damaged parts to be removed and replaced by new parts without disturbing these terminal or wiring connections, and, also, to a mounting which affords maximum protection to the distributing panel or part carrying these terminal or wiring connections so that it will not be readily damaged, although the hood or housing and the framework carrying the same is damaged when the upper portion is toppled over by surface collisions. This mounting further advantageously permits the enlargement of the terminal panel to increase the distributing, looping or cross-connecting capacity with minimum disturbance and replacement of parts and without disturbing the portion of the structure which is anchored underground and provides the means of feeding the cables into the unit and upwardly to the upper portion above the ground.

Another feature of the invention resides in the construction of the lower section which may be readily installed, and, although anchored to remain sturdily in place, it may be removed and re-located with minimum labor, and it further resides in the construction of the parts of this lower section whereby sinking or tipping without the use of concrete is prevented and an easily accessible underground cable chamber may be provided with a drain sump for the chamber. Novel form of earth-gripper plates may be provided, which, together with the framework, provides an exceptionally simple and sturdy underground section.

A still further object of the invention resides in a compact, durable and simple construction of the type described, and in means that may be provided, say, between the sections and in the form of a plate through which the cables are brought above ground, this plate acting as a lead sealing plate which may be flooded with a compound to eliminate moisture and creepage.

A further feature of the invention may be found in the employment of a novel form of the aforesaid ground plate between the sections having simple and effective securing means for itself upon the lower section and for mounting the upper section whereby bolts that will shear and permit the upper section to topple over when struck by a blow that would otherwise damage the entire unit, may be replaceably carried upon this plate.

Other objects and advantages of the invention will be apparent from the following detail description when taken in connection with the accompanying drawings.

In the drawings:

Figure 1 is an elevation of an underground cable distributing unit embodying the invention;

Fig. 2 is a view illustrating the interior of the portion of the unit above the ground, the housing and the ground plate being in section;

Fig. 3 is a sectional view taken on line 3—3 of Fig. 2 to illustrate mounting upon the frame of the upper structure one form of the distributing panel or unit that may be employed;

Fig. 4 is a section taken along line 4—4 of Fig. 2 to illustrate the manner in which the lower end of this distributing panel or unit is floatably guided to minimize damage to the terminals and cables in case of a knockover;

Fig. 5 is a section taken along line 5—5 of Fig. 2 to illustrate the ground plate in top elevation but without a dam that may be used therewith to provide a moisture proof seal at this point between the underground section and the portion accessible above the ground;

Fig. 6 is a section taken along line 6—6 of Fig. 2 to illustrate the fastening means between the ground plate and the underground section as well as to illustrate the ground-gripper plates secured to the frame of this underground section;

Fig. 7 is a sectional view taken along line 7—7 of Fig. 1 to illustrate the base of the frame of the underground section;

Fig. 8 is an enlarged perspective view of the ground plate before the employment of said dam;

Fig. 9 illustrates the manner in which the upper section may be toppled over without disturbing the lower section and without damaging the cables or distributing unit or panel in the upper section and without disturbing the service;

Fig. 10 is an enlarged detail section illustrating how the bolts securing the upper section to the lower section may be replaceably carried in the ground plate so that they may be quickly renewed in the event they are sheared or removed or it is desirable to increase the capacity of the distributing panel or unit in the upper section.

The underground cable distributing unit disclosed herein comprises two sections, one designated as A adapted to be anchored in the ground as illustrated in Fig. 1, and the other designated B adapted to be exposed above the ground and carried by the first section. Section A includes a frame formed of a number of angle irons 2 having base irons 3 attached at their lower end. The legs of irons 2 may have any angularity with respect to each other and may carry a plurality of earth-gripper plates designated broadly as 4. In the drawing, three frame irons 2 are provided and are arranged in a relation forming a cross section that is triangular whereby the three exteriorly formed faces may receive three gripper plates 5, 6 and 7. Likewise, three of the base irons 3 may be used and arranged so that each has an end 8 projecting a distance outwardly to form a part of the anchoring structure that prevents the unit herein disclosed from tipping and keeps this unit securely anchored in position in the ground. Each earth gripper plate is provided with three faces 9, 10 and 11 formed with vertical and horizontal grooves 12, the face 10 terminating in a wing 13 and the face 11 terminating in a wing 14, these wings being disposed along opposite vertical edges of each earth-gripper plate.

These plates and their three faces are constructed in a novel manner and particularly with respect to the disposition of wings 13 and 14 whereby to increase their gripping effect with the soil. Each wing 13 is preferably disposed on the side opposite and above wing 14. Earth-gripper plates 5, 6 and 7 are secured to frame irons 2 by bolts 15, as illustrated in Fig. 1, and each wing 13 rests upon wing 14 of an adjacent plate. As disposed in this manner, wings 13 and 14 will extend outwardly from these gripper plates at different angles from each other and will resist any tendency of the structure to rotate. Providing frame irons 2 and the base irons 3 as angle irons also increases the gripping surfaces in contact with the earth. The angularly extending wings 13 and 14 also provide greater gripping and tend to prevent tipping or sinking. Grooves 12 in the faces of plates 5, 6 and 7 tend to provide an increased interlock between these plates and the earth to prevent shifting or movement of the plates and to increase the anchoring effect of the underground section.

The upper end of frame irons 2 are adapted to be secured to depending lugs 16 having angularly related legs corresponding to those of said frame irons 2, these lugs being carried by a ground plate 20 provided with an outer angular flange 21 acting as a watershed to protect bolts 22 which secure depending lugs 16 to the upper end frame irons 2, and also to protect the space about the upper end of these frame irons 2, this being illustrated in Fig. 2. With earth-gripper plates 5, 6 and 7 secured adjacent the upper part of frame irons 2, an easily accessible underground cable chamber 23 may be provided directly below ground plate 20. Using frame angles 2 and base angles 3 in the form of an open framework below these earth-gripper plates permits the earth to fill about these parts and thereby to provide a drain sump for this underground cable chamber 23. It will be noted that arranging the earth-gripper plates as individual elements adapted to be attached by bolts 15 to the frame irons 2 has an additional advantage of allowing these gripper plates to be furnished locally, if so desired, so as to avoid cost of shipping over relatively great distances.

As shown in detail in Fig. 8, ground plate 20 is provided with an annular upstanding flange 27 having central joining ribs 28, 29 and 30 to form a plurality of cable sealing pockets 31, 32 and 33 that permit the use of a dam at this point. The floor 34 of these pockets is preferably cut away to form openings 35, 36 and 37 through which cables 38 and 39 extend upwardly from underground chamber 23. The dam may be provided by forming a lead plate 40 about these cables which lead plate may seat upon the floor 34 of each chamber and a compound 41 may be poured thereover, as illustrated in Fig. 10. Thus, it is impossible for any accumulation of moisture in underground cable chamber 23 to pass above and beyond ground plate 20.

Upper section B also includes a frame structure which, in the preferred form of the invention herein illustrated, comprises vertical standards 24, 25 and 26 secured to ground plate 20 at their lower ends. Standards 24, 25 and 26 are designed to carry a distributing unit or terminal mounting panel 45 which, as shown in the drawings, may be of a sectional type that permits the use of units such as those designated 47 and 48 in Fig. 2, to allow for increasing or changing the capacity of the device herein disclosed. Each section may have one or more molded resinous bodies 49 carrying terminals 50 that extend through the bodies to carry binding posts disposed on the inside faces in a sealed chamber. Fanning strips 51 may be provided along the vertical sides of the bodies 49 for use in connection with looping or cross-connecting wires between certain of the terminals on the same body 49 or from terminals on one body to terminals on other bodies if more than one body is used. For an underground distributing unit of the type herein disclosed, it is found that a terminal unit of the kind employed may well serve its purpose because of its capacity and compactness and the ability to mountably suspend the same between the vertical standards 24, 25 and 26 so that it may freely float at its lower end to minimize damage in the case of a knockover, as illustrated in Fig. 9. This type of terminal unit further admits of a sectional construction that permits an increase of capacity to accommodate additional equipment or installations in the service. The increased capacity is obtained by sections to those already in service without disturbing the wiring connections at the terminals or binding posts within the sealed chamber. The extra sections may be quickly added without requiring special materials or labor. It is believed unnecessary to explain the construction of this distributing unit 45 in greater detail because it is fully disclosed and claimed in United States Letters Patent No. 2,317,450, granted April 27, 1943, to George R. Folds and Roy M. Schultz, and assigned to the common assignee hereof, to which patent further reference may be made for a fuller description.

If more than one section is provided, the lower section designated 46 in Fig. 2 is provided with a plate 54 carrying self-soldering nozzles 53 for cables 38 and 39 extending upwardly through ground plate 20 from the underground cable chamber 23. These self-soldering nozzles 53 provide a moistureproof seal between the interior of these terminal distributing unit sections and the interior of the upper section B.

A plate 55 may be secured by fastening elements, such as screws 56, to the top of upper section 47. Corners 57 of plate 55 extend beyond the terminal distributing unit 45 to receive screws 58 fastening the same to the upper end of standards 24, 25 and 26. In this manner, the terminal distributing unit may be suspended between standards 24, 25 and 26 by this top plate 55 and may be detachably secured to the upper ends of the standards. Likewise, lower carrying plate 54 may be provided with extension plates 60 at each corner 61 of plate 54. Extension plate 60 may be secured to corner 61 of plate 54 by bolts 62 and 63. Screws 64 or other securing means may attach plate 54 to the bottom end of lower section 48. This plate will have one or more openings 65 therein to accommodate cable sealing nozzles designated 53 and 54, the number depending upon the number of cables which the underground cable distributing unit, herein disclosed, accommodates. Extension plates 60 are cut away at their ends, as indicated at 66, so that this extension plate 60 may fork or embrace standards 24, 25 and 26 and provide thereby means for floatably guiding the lower end of the terminal distributing unit 45.

A hood or housing 68 forms a part of upper section B and has a cover 69, which, with a key-operated lock 70, locks housing 68 in position to prevent unauthorized access to the terminal connections on the terminal distributing unit 45. Plate 55 may be provided with an upstanding bolt 71 secured thereto and extending through an apertured boss 72 on cap 69 to receive this key-operated lock, as illustrated in Fig. 2. With lock 70 in position and operated by a key to locking relation, cap 69 is held upon the upper end of housing 68. Neither cap 69 or housing 68 may be removed until the proper key is employed to operate lock 70.

The lower end of standards 24, 25 and 26 may be provided with tapped openings 75 for receiving a threaded bolt 76, as illustrated in detail in Fig. 10. Bolt 76 is preferably longer than opening 75 so as to extend a distance therefrom. Integral cages 77 are formed at the points where ribs 28, 29 and 30 meet the annular flange 27 on ground plate 20. Cages 77 have open portions 78, 79 and 80 and a top wall 81 through which bolts 76 extend and receive a nut 82. Open portions 78, 79 and 80 afford access to nut 82 of each bolt 76 so that these nuts 82 may be inserted upon or removed from bolts 76. If bolts 76 are first threaded into tapped openings 75 of standards 24, 25 and 26, the extending end of these bolts may then be inserted through the openings of top wall 81 of cages 77 so that nuts 82 may then be threaded upon the protruding ends of bolts 76. To prevent or to minimize damage to upper section B upon an external impact or collision, bolts 76 may be made of a material that will readily shear and allow this upper section to be toppled over, as illustrated in Fig. 9. It is found that frequently such impacts may cause denting or other damage to housing 68 as indicated at 90, and possibly damage to standards 24, 25 and 26. The bolts 76 will yield and shear, and allow the upper section to topple over before the terminal distributing unit 45 is injured and the connections of cables 38 and 39 are disturbed. Consequently, the use of shearable bolts 76 for the purposes disclosed prevent these external impacts or collisions from disturbing the service of the system although a portion of the structure above ground may be damaged. It will be apparent that housing 68 may be readily replaced, and also, it is apparent that standards 24, 25 and 26 may readily be replaced without requiring a disturbance of service as a result of the wiring connections upon the terminals 50 of the terminal distributing unit 45 remaining intact.

The type of connection between standards 24, 25 and 26 and ground plate 20 further allows replacement of these standards if different lengths are desired in order to accommodate a small or greater number of sections. If additional sections are desired, longer standards are provided and a hood or housing 68 of suitable length is also provided. Standards 24, 25 and 26, as well as the housing 68, may be furnished in predetermined lengths to accommodate a given number of sections of the terminal distributing unit 45. Cap 69 remains the same for any arrangement desired. Any change in the capacity of unit 45 merely requires the removal of upper plate or bracket 55 by the removal of screws 56. If another section is to be added, it may be attached to the upper end of the upper section in the manner disclosed in the aforesaid Letters Patent No. 2,317,450. The wires of cables 38 and 39 or additional cables may then be extended upwardly through the sealed inner chamber and secured to the binding posts of terminals 50. Upper plate 55 may then be attached to the upper end of the added section by the screws 56 and then secured to the upper ends of the standards 24, 25 and 26 by means of the screws 58. It will be apparent that the wires of cables 38 and 39 which are attached to the binding posts of terminals 50 of the sections in service will not be disturbed during the addition of a section in the manner described.

Certain novel features of construction of section B that is disposed above ground plate 20 may be advantageously used in cable terminals generally, and consequently, it is not intended that the invention as it pertains to such features shall be limited to an underground cable distributing unit. It is apparent that section B comprises a structure that may be readily changed with respect to capacity without requiring undue cost in replacement of parts or employment of labor and without disturbing the cable wire connections already made and consequently the service furnished thereby.

It will also be apparent that the underground structure A provides a novel form of anchorage that eliminates the need of special labor and materials and particularly expensive manhole construction of concrete and brick. The unit may be set in a cable-laying trench and the earth filled about the lower part so that plate 20 rests at the ground level. Earth gripper plates 4 and the open angle iron framework below offer sufficient resistance to maintain the unit vertical and securely anchored.

Bolts 76 carry upper section B upon lower structure A in a manner preventing serious damage in the event of a service impact or collision and protects the terminal unit 45 and cable connections so that service will not necessarily be disrupted. The shearing of bolts 76 permits upper section B to topple over as shown in Fig. 9, which may remain in this condition without the disturbance of service until linemen discover the accident and restore the unit to its upright position.

Without further elaboration, the foregoing will so fully explain the gist of our invention that others may, by applying current knowledge, readily adapt the same for use under varying conditions of service, without eliminating certain features, which may properly be said to constitute the essential items of novelty involved, which items are intended to be defined and secured to us by the following claims.

We claim:

1. An underground cable distributing unit comprising a lower section adapted for underground anchorage to receive one or more underground cables that extend upwardly therethrough, an upper section having a plurality of terminals to receive the wires of said underground cables, and a connection betwen said sections including a plate having a cable opening therein for said underground cables extending upwardly therethrough and a compound for sealing said opening about said cables, said connection including shearable means adapted to free said upper section intact from said lower section thereby to prevent injury to said terminals and said cables when said upper section is struck by a blow tending to move said upper section horizontally and said plate and said compound being adapted to remain with the lower section when said upper section is struck by said blow.

2. An underground cable distributing unit comprising a lower sectional unit adapted for underground anchorage to receive one or more underground cables that extend upwardly therethrough, an upper sectional unit having a plurality of terminals to receive the wires of said underground cables, and a replaceable destructible connection between said units, said destructible connection freeing said upper unit from said lower unit, when said upper unit is struck by a blow tending to move said upper unit horizontally, without disturbing the cables and their wiring connections at said terminals in said upper unit.

3. An underground cable distributing unit comprising an underground frame structure adapted for underground anchorage to receive one or more cables that extend upwardly therethrough, a housing to provide a terminal compartment above the ground, a frame for said housing, a distributing panel for said frame disposed within said housing, terminals on said panel to receive the wires of said cables extending upwardly through said underground frame structure, a plate carried by and secured to said underground frame structure, replaceable frangible connections between said plate and said frame, means to receive and secure said frame in upright position upon said plate, said plate having a receptacle-formed portion provided with openings through which said cables pass, and a compound for said receptacle-formed portion to provide a moistureproof dam between said underground structure and said terminal compartment and to seal said cables in said openings.

4. An underground cable distributing unit comprising an underground frame structure adapted for underground anchorage to receive one or more cables that extend upwardly therethrough, a housing to provide a terminal compartment above the ground, a frame for said housing, a suspended distributing panel for said frame within said housing, terminals on said panel to receive the wires of said cables extending upwardly through said underground frame structure, a plate carried by and secured to said underground frame structure, and shearable means to receive and secure said frame in upright position upon said plate, said shearable means adapted to free said frame without disturbing the wiring connections at said terminals on said panel when said housing or any of the parts above the ground are struck by a blow having a horizontal component tending to damage the same.

5. An underground cable distributing unit comprising an underground frame structure adapted for underground anchorage to receive one or more cables that extend upwardly therethrough, a housing to provide a terminal compartment above the ground, a frame for said housing, a terminal board carried suspended by said frame to receive the wires of said cables extending upwardly through said underground frame structure, a cover carried by and secured to said underground frame structure, and replaceable bolts to receive and secure said frame in upright position upon said cover, said bolts being shearable to free said frame from said cover without disturbing the wiring connections at said terminals carried by said frame when said housing or any of the parts above the ground are struck by a blow having a horizontal component tending to damage the same.

6. An underground cable terminal distributing unit comprising an underground frame structure adapted for underground anchorage to receive one or more cables that extend upwardly therethrough, a housing providing a terminal compartment above the ground, a frame for said housing, terminals carried by a terminal board mounted suspended on said frame to receive the wires of said cable extending upwardly through said underground frame structure, a plate between said underground frame structure and said frame, and bolts to receive and secure said frame in upright position upon said plate, said bolts being shearable to free said frame from said underground frame structure without disturbing the wiring connections at said terminals carried by said frame when said housing or any of the parts above the ground are struck by a blow having a horizontal component tending to destroy the housing, there being means to replaceably anchor said bolts upon said plate.

7. An underground cable terminal distributing unit comprising an underground frame structure adapted for underground anchorage to receive one or more cables that extend upwardly therethrough, a housing providing a terminal compartment above the ground, vertical standards within said housing, means for supporting said standards upon said underground frame structure, said means including replaceable shearable means that will yield to a blow having a horizontal component against said housing tending to damage the same whereby said standards may be severed from their said supporting means, a distributing unit within said terminal compartment having terminals to receive wiring connections from said cables, and means for carrying said distributing unit upon said standards within said compartment whereby said standards and said hood may be replaced if damaged without disturbing said wiring connections or replacing said distributing unit.

8. An underground cable terminal distributing unit comprising an underground structure adapted for underground anchorage to receive one or more cables that extend upwardly therethrough, a housing providing a terminal compartment above the ground, vertical standards within said housing, a plate carried by said underground structure and supporting said standards, a distributing unit within said terminal compartment having terminals to receive wiring connections from said cables, and means for suspending said distributing unit between said standards, said vertical standards being detachably arranged with respect to said supporting means and said suspension means being detachably arranged with respect to said standards whereby the capacity of said distributing unit may be changed by a replacement of said standards and said housing without disturbing said wiring connections or said distributing unit itself.

9. An underground cable terminal distributing unit comprising an underground structure adapted for underground anchorage to receive one or more cables that extend upwardly therethrough, a housing providing a terminal compartment above the ground, vertical standards within said housing, a sectional distributing unit within said terminal compartment having terminals to receive wiring connections from said cables, and bracket means attached to said distributing unit adjacent the upper end thereof and attached to the upper end of said standards for suspending said distributing unit between said standards, said bracket means being detachably arranged with respect to said standards and said distributing unit whereby said standards and said housing may be replaced to secure a length therefor corresponding to the number of sections to be employed in said distributing unit.

10. An underground cable terminal distributing unit comprising a plate adapted to be anchored at or near the ground surface, shearable bolts extending from said plate, standards carried by said bolts, a housing surrounding said standards to provide a terminal compartment above the ground, a distributing unit having terminals to receive wiring connections of one or more underground cables extending through said plate, and means to suspend said distributing unit between said standards, said means being detachably arranged with respect to said standards whereby said standards and said housing are replaceable without disturbing said wiring connections at said terminals.

11. A cable terminal distributing unit comprising a housing providing a terminal compartment, vertical standards within said housing and adapted to support said housing, a base plate for supporting said standards, a sectional distributing unit within said terminal compartment having terminals to receive wiring connections of one or more cables, upper bracket means carried by said standards for suspending said distributing unit between said standards and lower bracket means carried by said distributing unit in guiding relationship with respect to said standards, said upper bracket means being detachably engaged with said standards whereby said standards and said housing may be replaced to secure a length therefor corresponding to the number of sections to be employed in said distributing unit.

12. A cable terminal distributing unit comprising a housing, a plate for carrying said housing, vertical standards supported upon said plate, a distributing unit having terminals to receive wiring connections of one or more cables, and a bracket secured to each end of said distributing unit, the bracket at the upper end of said distributing unit having projections extending to said standards and fastening means to secure said bracket to said standards for suspending said distributing unit between said standards, the bracket at the lower end of said distributing unit having slotted projections which embrace said standards whereby to guide said distributing unit at its lower end upon said standards.

13. A cable terminal distributing unit comprising a hood, a cap for said hood, a base for receiving said hood, said base having a receptacle-formed portion provided with openings through which one or more cables may pass, a compound for said receptacle-formed portion to provide a moistureproof dam at said base where said cable or cables enter and to seal said cables in said openings, standards mounted on said base, a distributing unit having terminals to receive wiring connections of said cables, a bracket for each end of said distributing unit, means to secure the bracket at the upper end of said distributing unit to suspend said distributing unit at the top of and between said standards, and means on the bracket at the lower end of said distributing unit to embrace said standards whereby to guide said distributing unit at its lower end upon said standards.

14. An underground cable distributing unit comprising a lower section adapted to provide underground anchorage and to receive one or more underground cables that extend upwardly therethrough and an upper section having a distributing terminal structure accessible above the ground to receive the wire of said underground cables, gripper side plates for said lower section, and laterally formed wings on said gripper side plates, said side plates and said wings being provided with irregular surfaces to grip the earth said wings projecting beyond said gripper side plates to prevent the sinking or the tipping of said lower section.

15. An underground cable distributing unit comprising an underground frame structure adapted to provide underground anchorage and to receive one or more underground cables that extend upwardly therethrough, a distributing terminal structure supported upon said underground frame structure and accessible above the ground to receive the wires of said underground cables, said underground frame structure including a base and side walls having laterally formed wings projecting beyond said side walls.

16. An underground cable distributing unit comprising a distributing terminal structure accessible above the ground and an underground structure therefor adapted to provide underground anchorage and to receive one or more underground cables that extend upwardly therethrough for terminal connections at said distributing terminal structure, said underground structure including a base and an open frame including side plates mounted on said frame to provide an underground cable chamber, said open frame extending a distance below said side plates to provide a drain sump below said underground cable chamber by the earth fill disposed in and about said open frame below said side plates.

17. An underground cable distributing unit comprising a distributing terminal structure accessible above the ground and an underground structure therefor adapted to provide underground anchorage and to receive one or more underground cables that extend upwardly therethrough for terminal connections at said distributing terminal structure, said underground structure including earth-gripper walls, an open frame below said earth-gripper walls, and extensions at the base of said open frame, each extension projecting in a different direction and having angularly related surfaces.

18. An underground cable distributing unit comprising a distributing terminal structure accessible above the ground and an underground structure therefor adapted to provide underground anchorage and to receive one or more underground cables that extend upwardly therethrough for terminal connections at said distributing terminal structure, said underground structure including a base and a multi-side open frame, earth-gripper plates secured to the sides of said frame, each plate having a lateral wing along each vertical side extending beyond its plate and the adjoining plate, the wings along the two sides of each plate being offset with respect to each other whereby the wings of adjoining plates cross each other and extend in different directions, the crossed wings of adjoining plates having a combined length not in excess of the length of the adjoining vertical sides of said plates.

19. The combination with an underground cable distributing unit adapted for use with an upper section having a terminal chamber therein disposed substantially at or above the ground surface comprising vertically disposed frame members to be embedded in the ground, base irons secured to said frame members, plates at the upper end of said frame members forming an enclosure for the area therebetween whereby to provide an underground cable chamber, the portion of said frame members below said plates forming an open framework to receive a fill therebetween whereby to form a sump below said cable chamber, and a sealing cover for said cable chamber supported above said frame members.

20. The combination with an underground cable distributing unit adapted for use with an upper section having a terminal chamber therein disposed substantially at or above the ground surface comprising frame members to be embedded in the ground, an enclosure for the upper part of said frame members whereby to provide an underground cable chamber, the portion of said frame members below said enclosure forming an open framework to receive a fill therebetween whereby to form a sump below said cable chamber, and a sealing cover for said cable chamber.

21. The combination with an underground cable distributing unit adapted for use with an upper section having a terminal chamber therein disposed substantially at or above the ground surface comprising frame members to be embedded in the ground, a base support secured to said frame members, and an enclosure for the upper part of said frame members whereby to provide an underground cable chamber, the portion of said frame members below said enclosure forming an open framework to receive a fill therebetween whereby to form a sump below said cable chamber.

22. A base assembly of an underground cable distributing unit adapted for use with an upper section having a terminal chamber therein, said base assembly comprising frame members to be embedded in the ground, and a plurality of earth-gripper plates forming an enclosure for at least a portion about said frame members.

23. A base assembly of an underground cable distributing unit adapted for use with an upper section having a terminal chamber therein, said base assembly comprising frame members to be embedded in the ground, and a plurality of earth-gripper plates forming an enclosure about said frame members, said gripper plates being disposed substantially at the upper end of said frame members to form thereat an underground cable chamber, the lower portion of said frame members forming open sides to receive a fill therebetween and form thereby a sump below said cable chamber.

24. A base assembly of an underground distributing unit adapted for use with an upper section having a terminal chamber therein, said base assembly comprising frame members to be embedded in the ground, a plurality of earth-gripper plates forming an enclosure about said frame members, and a plurality of angularly related faces on each gripper plate.

25. A base assembly of an underground cable distributing unit adapted for use with an upper section having a terminal chamber therein, said base assembly comprising frame members to be embedded in the ground, and a plurality of earth-gripper plates forming an enclosure about said frame members at their upper end and each plate having a lateral wing along each vertical side extending beyond its plate and the adjoining plate, each wing being so constructed and arranged with respect to the adjacent wing of said adjoining plate that both said wings cross but extend in different directions and are of a combined length not in excess of the length of the adjoining vertical sides of said plates.

26. A base assembly of an underground cable distributing unit adapted for use with an upper section disposed substantially at or above the ground surface, said base assembly comprising frame members to be embedded in the ground, and a plurality of earth-gripper plates carried by said frame members, said gripper plates having earth-gripping surfaces provided with grooves therein to increase the gripping effect of said plates.

27. A base assembly of an underground cable distributing unit adapted for use with an upper section disposed substantially at or above the ground surface, said base assembly comprising longitudinal frame members defining a number of substantially open sides, plate-like members for said frame members forming closures for at least a portion of said frame members whereby to provide an underground cable chamber, and a cover plate carried at the upper end of said frame members, said cover plate being disposed over said cable chamber and providing a seal for said underground cable chamber.

28. A base assembly of an underground cable distributing unit adapted for use with an upper section disposed substantially at or above the ground surface, said base assembly comprising longitudinal frame members defining a number of substantially open sides, plate-like members forming closures at said open sides for at least a portion of said frame members whereby to provide an underground cable chamber, the portion of said frame members below said cable chamber to receive a fill therebetween and form thereby a sump below said cable chamber, a cover plate carried at the upper end of said frame members and disposed over said cable chamber, said cover plate providing a seal for said underground cable chamber and a water-shed on said cover plate extending beyond the limits of said cable chamber.

29. A base assembly of an underground cable distributing unit adapted for use with an upper section disposed substantially at or above the ground surface, said base assembly comprising longitudinal frame members defining a number of substantially open sides, plate-like members for said frame members forming closures for at least a portion of said frame members whereby to provide an underground cable chamber, a cover plate carried at the upper end of said frame members, said cover plate being disposed over said cable chamber and providing a seal for said underground cable chamber, and means being carried by and as a part of said cover plate for securing said upper section upon said base assembly.

30. A cable terminal distributing unit adapted for use with a section to be anchored below the surface of the ground and from which underground cables are to extend comprising a ground plate having provisions to secure said ground plate to said underground section to provide a rigid support, a plurality of standards mounted upon said base, means on the upper side of said ground plate to attach said standards to said ground plate, a distributing unit having terminals to receive wiring connections of said cables, means for suspending said distributing unit upon said standards, said suspending means carrying said distributing unit as a removable structure without requiring removal of the wiring connections of said cables from said terminals when said distributing unit is removed from said standards, and a hood for said distributing unit.

31. A cable terminal distributing unit adapted for use with a section to be anchored below the surface of the ground and from which underground cables are to extend comprising a ground plate having means for attaching the same to said underground section for a rigid support, a plurality of standards, removable means to mount said standards upon said ground plate, a distributing unit having terminals to receive wiring connections of said cables, means for removably carrying said distributing unit upon said standards so that said distributing unit may be removed as an independent structure from said standards without disturbing the wiring connections at said terminals, said last means likewise carrying said distributing unit upon said standards so that said removable mounting means of said standards may be destroyed or replaced without disturbing the wiring connections at said terminals.

32. A cable terminal distributing unit comprising a base plate, a plurality of standards extending upwardly with respect to said base plate, a distributing unit arranged in sectional form having a plurality of terminals to receive wiring connections of one or more cables, mounting means for suspending said distributing unit from the upper part of said standards, and means for securing additional sections to the original section or sections of said distributing unit without disturbing the wiring connections at said terminals of said original section or sections.

33. A cable terminal distributing unit comprising a base plate, a distributing unit arranged in sectional form having a plurality of terminals to receive wiring connections of one or more cables, means for mounting said distributing unit upon said plate, and means for securing additional sections in continuous relation to the original section or sections of said distributing unit without disturbing the wiring connections at said terminals of said original section or sections.

34. An underground cable terminal distributing unit comprising an underground frame structure adapted for underground anchorage to receive one or more cables that extend upwardly therethrough, a housing providing a terminal compartment above the ground, a frame for said housing removably mounted on said underground frame, terminals within said compartment to receive the wires of said cables extending upwardly through said underground frame structure, a mounting for said terminals, and means associated with said frame for said housing for carrying said terminal mounting within said compartment independently of said housing, said means being detachably arranged with respect to said frame for said housing whereby said frame for said housing may be replaced without disturbing the connections of the wires of said cables at said terminals upon said mounting.

WALTER C. HASSELHORN.
ROY M. SCHULTZ.

REFERENCES CITED

The following references are of record in the file of this patent:

UNITED STATES PATENTS

| Number | Name | Date |
| --- | --- | --- |
| 2,184,574 | Addie | Dec. 26, 1939 |
| 2,083,054 | Cline | June 8, 1937 |
| 2,078,969 | Patterson | May 4, 1937 |
| 870,053 | Scholes | Nov. 5, 1907 |
| 965,684 | Bierce | July 26, 1910 |
| 1,109,726 | Williams | Sept. 8, 1914 |
| 1,951,457 | Warner | Mar. 20, 1934 |
| 2,294,482 | Siegmund | Sept. 1, 1942 |
| 1,083,582 | Bates | Jan. 6, 1914 |

FOREIGN PATENTS

| Number | Country | Date |
| --- | --- | --- |
| 204,054 | Great Britain | Feb. 14, 1924 |